United States Patent [19]

Yoneya

[11] 4,027,361
[45] June 7, 1977

[54] SLIDING CLASP FASTENER

[75] Inventor: Kiyoo Yoneya, Kurobe, Japan

[73] Assignee: Yoshida Kogyo Kabushiki Kaisha, Japan

[22] Filed: Feb. 11, 1976

[21] Appl. No.: 657,181

[30] Foreign Application Priority Data

Feb. 21, 1975 Japan .................. 50-24712[U]

[52] U.S. Cl. .................. 24/205 R; 24/205.15 H; 180/90.6; 74/566; 116/DIG. 20
[51] Int. Cl.² .................................. A44B 19/26
[58] Field of Search .............. 24/205 R, 205.15 H; 74/566; 116/DIG. 20; 180/90.6

[56] References Cited

UNITED STATES PATENTS

| 1,457,141 | 5/1923 | Bockover | 180/90.6 |
| 2,042,105 | 5/1936 | Kelley | 24/205 R |
| 2,351,803 | 6/1944 | Best | 24/205 R |
| 2,365,578 | 12/1944 | Morin | 24/205 R |
| 2,392,685 | 1/1946 | Morin | 24/205 R |
| 2,394,732 | 2/1946 | Williams | 24/205 R |
| 2,905,017 | 9/1959 | Randolph | 116/DIG. 20 |
| 3,285,093 | 11/1966 | Sellmeyer | 74/566 |
| 3,473,404 | 10/1969 | Ross | 74/566 |

FOREIGN PATENTS OR APPLICATIONS

| 673,394 | 6/1952 | United Kingdom | 180/90.6 |

Primary Examiner—Bernard A. Gelak
Attorney, Agent, or Firm—Bucknam and Archer

[57] ABSTRACT

A sliding clasp fastener has a pair of sliders movable on and along a pair of element-supporting tape edges, the sliders having element-separating ends disposed in confronting relationship to each other. A retainer member connects the sliders together and maintains the sliders in spaced-apart relation to defining therebetween a gap or space where fastener elements are uncoupled. The sliding clasp fastener has utility for covering an opening in the top surface of a selector box mounted in an automatic transmission-type automobile with a transmission selector lever extending through the gap between the sliders.

1 Claim, 2 Drawing Figures

SLIDING CLASP FASTENER

BACKGROUND OF THE INVENTION

This invention relates to a sliding clasp fastener and more particularly, to one having a pair of sliders movable on and along the rows of interlocking elements of a pair of fastener stringers, the sliders having their respective element-separating ends disposed in spaced-apart confronting relationship and being interlinked by a retainer ring.

SUMMARY OF THE INVENTION

A primary object of the invention is to provide a sliding clasp fastener having a pair of oppositely disposed sliders with a gap or space formed by uncoupled fastener elements between the slider pair.

Another object of the invention is to provide a sliding clasp fastener of the type described which has utility for covering an opening in the top surface of a selector box mounted in an automatic transmission-type automobile with a transmission selector lever extending through the gap between the sliders, so that wind, dust or noise can be substantially prevented from entering the interior of the automobile through the opening in the box.

According to the invention, a sliding clasp fastener has a pair of sliders mounted for movement on and along the rows of fastener elements and each having an element-separating end at which the diamond is located for separating or uncoupling the fastener elements. The paired sliders are interlinked by a retaining means such as in the form of an annular retainer ring, with their respective element-separating ends disposed in diametrically opposed relationships defining therebetween a gap or space where the fastener elements are uncoupled.

Other objects, features and advantages of the invention will be apparent from the following detailed description taken in conjunction with the accompanying drawing which illustrates a preferred embodiment which the invention may assume in practice.

DETAILED EXPLANATION OF A PREFERRED EMBODIMENT

Figure 1:
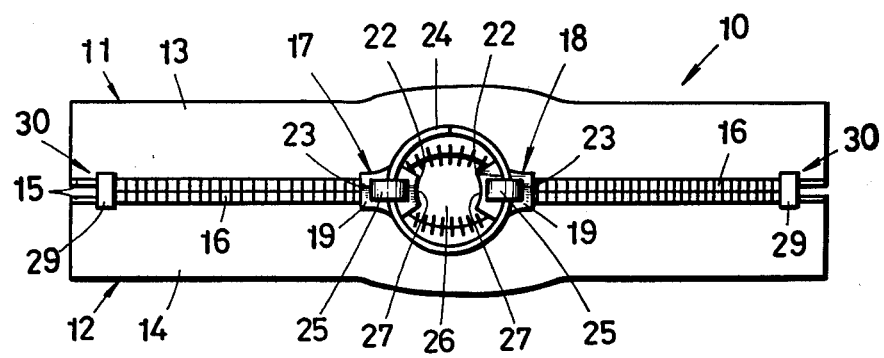
FIG. 1 is a plan view of a sliding clasp fastener provided according to the invention.

Referring now to FIG. 1, a sliding clasp fastener 10 constructed in accordance with the invention comprises a pair of oppositely disposed stringers 11, 12 having a pair of support tapes 13, 14, respectively, each having mounted on its one longitudinal beaded edge 15 a row of interlocking fastener elements 16, and a pair of sliders 17, 18 mounted for reciprocal sliding movement on and along the element supporting edges 15 of the tapes 13, 14 to take the opposed rows of the fastener elements 16 into and out of engagement with one another.

The fastener elements 16 are herein shown for illustrative purposes to be of a discrete formation but may be of a continuous coil or meandering structure. Each of the sliders 17, 18 is of the usual construction having spaced-apart upper wing 19 and lower wing (not shown) which are bent to form side flanges 20 (FIG. 2) and connected by a neck or diamond (not shown) to provide a substantially Y-shaped channel for guiding the movement of the fastener elements 16 therethrough.

The sliders 17, 18 each have an entrance end or element-separating end 22 at which the fastener elements 16 emerge from the guide channel to be separated or uncoupled and an exit end 23 at which the fastener elements 16 emerge from the guide channel to couple with one another. The sliders 17, 18 are mounted on the respective rows of fastener elements 16 with their entrance ends 22 confronting to each other, so that the fastener elements 16 when interposed between the opposed sliders 17, 18 are held in uncoupled or separated relation.

The paired sliders are interlinked by a retainer means 24 extending through bails 25, with their respective element-separating ends disposed in diametrically opposed relationship, defining therebetween a gap or space 26 where the fastener elements are uncoupled. The retainer means 24 is preferably annular in shape as shown, but may be triangular or square as the case may be.

The entrance end 22 of each of the sliders 17, 18 is recessed to provide a concave surface 27 for slidably engaging the round peripheral surface of a transmission selector lever 28 (FIG. 2) which extends upwardly through the gap 26 between the connected sliders 17, 18. A pair of end stops 29 are secured to the fastener stringers 11, 12 at their opposite ends 30 in order to limit or terminate thereat the movement of the sliders 17, 18, respectively, when the sliders are manipulated to open the fastener 10.

Figure 2:
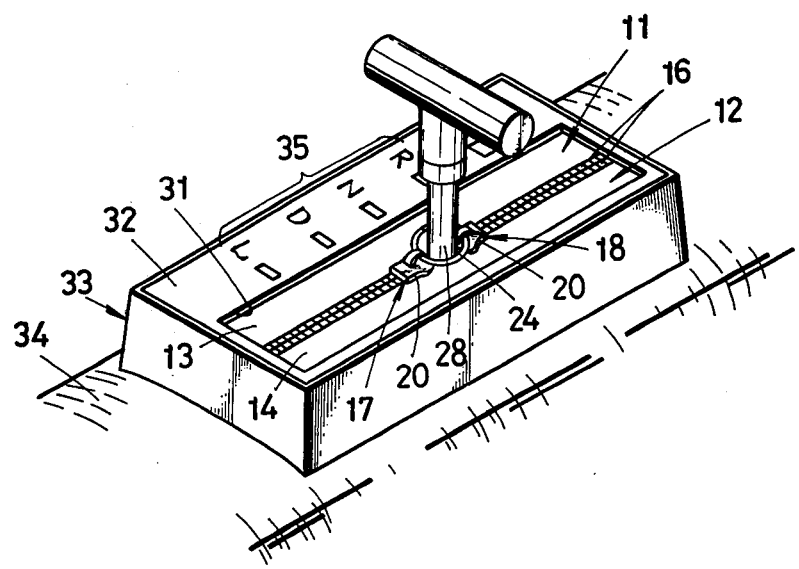
FIG. 2 is a perspective view of a selector box mounted in a transmission tunnel of an automobile and having a sliding clasp fastener arranged to substantially cover an opening in the top surface of the selector box.

FIG. 2 shows the sliding clasp fastener 10 of the invention covering an elongate opening 31 in the top surface 32 of a selector box 33 mounted on a transmission tunnel 34 in an automatic transmission type automobile. The sliding clasp fastener 10 is attached to the marginal edges of the opening 31 by any suitable means. The transmission selector lever 28 extends upwardly through the opening 31 and is movable longitudinally of the opening 31. The selector box 33 has on the top surface 32 a series of lever shift position indicators 35. For smooth and correct manipulation of the shift lever 28, the rows of fastener elements 16 must be aligned with the path of movement of the lever 28.

The transmission selector lever 28 extends also through the gap 26 and fits snugly with the recessed surfaces 27 of the sliders 17, 18. The sliders 17, 18 are retained in place by the retainer ring 24 which joins the sliders together and extends in surrounding relation to the lever 28. Thus, the opening 31 in the selector box 33 can be substantially closed off by the sliding clasp fastener 10.

For assembling the sliding clasp fastener 10 on the transmission selector lever 28, the sliders 17, 18 are moved away from each other to open the gap 26 large enough to permit the insertion of the transmission selector lever 28 therethrough. After the insertion of the lever 28 through the gap 26, the sliders 17, 18 are brought into contact with the lever 28 and then, the retainer ring 24 is installed to connect the sliders 17, 18 together thereto in diametrically opposed relation. It is to be understood that the ring 24 can be varied in size depending upon the diameter of the particular selector lever used.

When the transmission selector lever 28 is moved to a selected position, one of the sliders 17, 18 is pushed by the lever to uncouple the interengaged element rows, while the other slider is pulled by the retainer ring 24 to couple the disengaged element rows together, with the front abutting surfaces 27 of the sliders 17, 18 maintained in engagement with the lever 28 to close off the opening 31 regardless of the position of the lever 28.

While a certain preferred embodiment has been described and shown by way of example only, it will be understood that modifications and variations may be effected without departing from the scope of the following claims. For example, the retainer means 24 may be a suitable string which is threaded through the slider bails 25 and has its ends knotted.

What is claimed is:

1. In combination, a base means having a slot; a sliding clasp fastener connected to said base means to cover said slot, said sliding clasp fastener having interengageable rows of fastener elements and a pair of sliders moveable along said rows of fastener elements to engage and disengage same to establish a limited length moveable open gap in the sliding clasp fastener along which gap the fastener elements are disengaged, and beyond said gap the fastener elements being engaged, each of said sliders having an open bail; a retainer loop member extending through the bail of each slider to keep said sliders in a spaced-apart relation to determine the size of said gap, but allow limited relative movement of said sliders; and a moveable bar member extending through said gap and retainer loop member, said bar member being moveable along the direction of said rows of fastener elements and disposed for engagement with a contact surface on at least one of said loop member and sliders to correspondingly establish the location of said gap.

* * * * *